United States Patent Office 3,194,510
Patented July 13, 1965

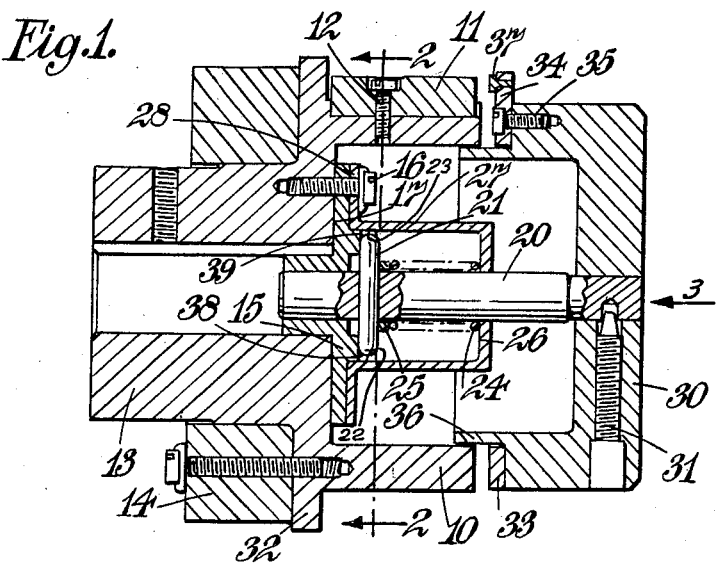
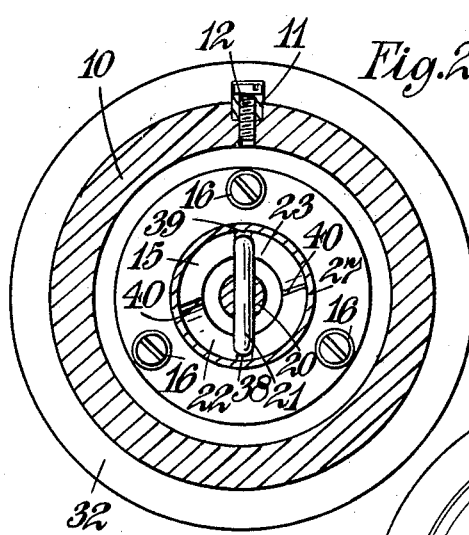
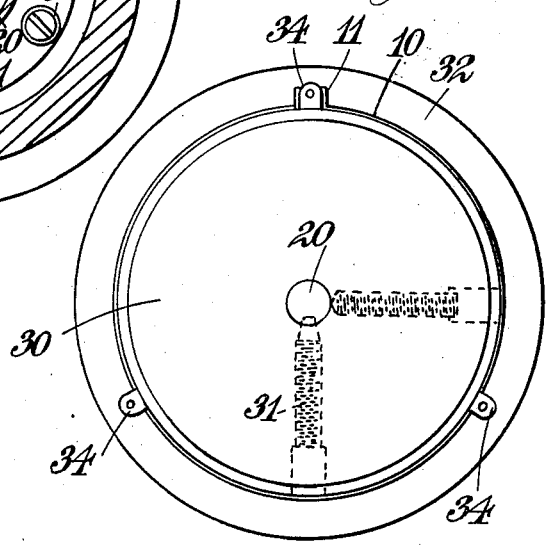

3,194,510
SPOOL CARRIERS
Harry James Charles Etherington, London, England, assignor to Decca Limited, London, England, a British company
Filed Mar. 18, 1963, Ser. No. 265,772
Claims priority, application Great Britain, Mar. 30, 1962, 12,403
7 Claims. (Cl. 242—68.3)

This invention relates to carries for holding in driving engagement spools such as are used in film and magnetic or paper tape handling mechanism.

A spool carrier for this purpose must be capable of holding a spool in driving engagement with a driving member yet must be capable of readily releasing the spool so that the spool can be removed and replaced. Standardised spools of the N.A.B. type are commonly employed; such spools have a central bush portion with three recesses for engaging three driving dogs on a driving hub, the dogs being spaced at 120° intervals around the driving hub. Heretofore it has been the practice to employ a screw threaded locking mechanism to tighten a clamping member holding the spool onto the hub and difficulty may be experienced in releasing a spool if the locking mechanism has been tightened hard.

It is an object of the present invention to provide an improved form of spool carrier facilitating the securing of a spool on the carrier and the release of a spool from the carrier.

More particularly, it is an object of the invention to provide a spool carrier on which a spool can be secured with a predetermined locking pressure holding the spool in position but which can be released with very little physical effort.

It is a further object of the invention to provide a spool carrier in which the spool is locked on the carrier with a spring clamping the spool against an abutment but in which a cam is provided for enabling the clamp to be released without having to apply a manual pull greater than the spring pressure.

The following is a description of one embodiment of the invention suitable for holding and driving N.A.B. type spools, reference being made to the accompanying drawings in which:

FIGURE 1 is a section through a hub block assembly along the axis thereof;

FIGURE 2 is a section along the line 2—2 of FIGURE 1; and

FIGURE 3 is a view looking along the line of the arrow A on FIGURE 1.

An N.A.B. type spool has an inner cylindrical surface with three recesses in this surface extending axially for the width of the spool whereby the spool may be driven by putting it on a cylindrical carrier having one or more dogs adapted to engage in these recesses.

Referring to the drawings, the spool carrier comprises a driving member 10 in the form of a short cylinder constituting a hub portion and having a dog 11 secured on the cylinder at one point on the periphery thereof by means of a counter-sunk screw 12. The cylinder 10 is formed integrally with a hollow driving shaft 13 on which is fixed a pulley 14 for driving the spool carrier. Within the hollow interior of the shaft 13 and cylinder 10 and co-axially located therein is a cam member 15 formed of nylon material, this cam member 15 being secured by bolts 16 onto a shoulder 17 formed internally within the hollow driving member 10. The cam member 15 is of annular form and constitutes a bearing for supporting a spindle 20 which is co-axial with the hollow shaft 13 and which is rotatable within the cam member. Extending diametrically through this spindle 20 is a stainless steel pin 21 which protrudes on two opposite sides of the spindle 20 and has end portions which constitute cam followers, these end portions bearing in the axial direction against cam surfaces on the cam member 15. This cam member 15 has two cam surfaces 22, 23 arranged to engage the two ends of the pin 21 respectively. Each of these cam surfaces in a typical construction extends through an arc of about 60° around the axis of the assembly. These cam surfaces face forwardly, that is in an axial direction to the right in FIGURE 1, and are shaped so that, as the spindle 20 is rotated in the cam member, if the pin 21 remains in contact with these cam surfaces it is moved axially. Hence, by such rotation, the spindle 20 is moved axially from an inner position (i.e. to the left in FIGURE 1) at one end of the cam surfaces to an outer position (i.e. to the right in FIGURE 1) when the pin 21 is at the other end of the cam surfaces. Referring to FIGURE 2, the pin 21 is shown located at the counterclockwise extremity of the cam surfaces 22, 23 that is to say where the pin is at its extreme right-hand position in FIGURE 1. Rotation of the pin in the clockwise direction as seen in FIGURE 2 causes the ends of the pin to move in the direction to the left of FIGURE 1. A helical spring 24 is provided urging the pin 21 into engagement with the cam surfaces 22, 23. In the particular construction shown in the drawings, this spring is located around the spindle 20 on the side of the pin remote from the cam surfaces. One end of the spring 24 bears against a washer 25 which in turn bears against the aforementioned pin 21 and the other end of the spring 24 bears against a radially inwardly directed flange 26 on the end of a sleeve 27. This sleeve 27 surrounds said spindle 20 and spring 24 and is bolted, by means of a radially outwardly directed flange 28, to the shoulder 17 on the inside of the driving member 10. The flange 28 is secured in position by the aforementioned bolts 16 which hold the flange 28 in position over the cam member 15.

A knob 30 is secured on the front end of the spindle 20, that is to say the right-hand end in FIGURE 1, by means of a set screw 31. This knob 30 constitutes an operating member and conveniently is formed of aluminium with a roughened external cylindrical surface. The knob 30 is of slightly smaller external diameter than the internal diameter of a spool so that a spool may be passed over this knob onto the driving member 10.

The driving member 10 has a radial flange 32 forming a back stop against which a spool may be pressed when it has been put over the knob 30 onto the driving member 10. Secured on the rear surface of the knob 30, that is to say the surface of the knob adjacent the driving member 10, is a retaining ring 33 having three ears 34. In the particular construction shown only a single driving dog 11 is provided on the member 10 but three dogs evenly spaced may be provided in the conventional manner if desired and these would be aligned with three evenly spaced ears 34 on the ring 33. The retaining ring 33 is bolted onto the knob 30 by means of bolts 35. Conveniently the ring 33 fits over an inwardly extending cylindrical portion 36 on the knob 30. The cylindrical portion 36 fits within the aforementioned driving member 10 so as to block any entry of dust into the interior part of the assembly when the knob 30 is withdrawn outwardly. On each ear 34 is fitted a pad 37 conveniently formed of moulded nylon material. This pad 37 forms a bearing surface to press against the spool when the spool has been put on the driving member 10.

It will be seen that with this construction the spring 24 pushes the pin 21 and hence the spindle 20 and knob 30 rearwardly, that is to say to the left in FIGURE 1, so that the pin 21 normally seats against the cam surfaces 22, 23. The pin 21 may be pulled off the cam surfaces however by pulling the knob 30 outwardly against the spring pressure. The axial position of the knob 30 and hence of the retaining ring 33 will depend on the angular rotational position of the pin with respect to the cam surfaces 22, 23. The arrangement is made such that, when one ear 34 on the retaining ring 33 is aligned with the dog 11 on the driving member, the knob 30 is at its outermost position and conveniently the cam surfaces 22, 23 are provided with slight grooves 38, 39 at this point which is the position shown in the drawings so that the pin will locate on the cam surface at this point and the assembly will remain in this position. In this condition where the ear 34 and the driving dog 11 are aligned, a spool can be slipped over the knob 30 onto the driving member 10. When a spool has been put into position on the driving member in this way, the knob 30 is rotated in the clockwise direction in FIGURE 2 to move the pin 21 out of the aforementioned grooves 38, 39 so that it slides on the cam surfaces 22, 23 until it reaches abutments 40 at the other ends of these cam surfaces. As the pin slides on the cam surfaces, the pads 37 on the ears 34 are moved towards the spool and are rotated with the knob so that they press against the side of the spool thereby pressing the spool towards the rear flange 32 on the driving member 10. The assembly is constructed so that the pin 21 is held slightly away from the cam surfaces 22, 23 in this limiting position when it has been turned to reach the stop shoulders 40. The spool is thus locked into position on the assembly. To release the spool, the knob is turned in the opposite direction that is to say in the counterclockwise direction as viewed in FIGURE 2 and, if there is any friction between the pads 37 and the spool, this may be released by a slight outward pull of the knob 30. The pin 21 will ride along the cam surfaces 22, 23 to the outermost position where it will rest in the aforementioned groove. Thereupon the spool may be withdrawn from the spool holder assembly over the retaining ring 33 and knob 30.

I claim:

1. A carrier for holding in driving engagement a spool of the kind having one or more recesses in a bush portion for engaging a dog or dogs on a driving member comprising a hub portion with a dog or dogs for engaging said recess or recesses whereby said hub portion with a dog or dogs constitutes said driving member, a locking element carried on said hub portion for axial and rotational movement about the hub axis and having a radially extending ear or ears positioned correspondingly to said dog or dogs so that the spool can pass over the locking element when the ear or each ear is aligned with the corresponding dog but, by rotation of the locking element, the ear or ears can be turned to a position or positions adjacent the side of the spool, and an operating member mounted on the hub portion to be slidable axially therein and to be rotatable therein which operating member is secured to the locking element to effect axial and rotational movement of the locking element, spring means urging the operating member and the locking element axially to move the locking element towards the driving member and cam means arranged to effect axial movement of the operating member as it is rotated, said cam means being shaped so that the locking element is moved axially away from the driving member against the spring force as the operating member is rotated from a position in which the locking element clamps the spool on the driving member to a release position where the locking element ear or ears are aligned with said dog or dogs for releasing the spool, the cam means being arranged furthermore so that, in the locking position the aforementioned spring means urges the locking element tightly against the spool.

2. A spool carrier as claimed in claim 1 wherein means are provided for limiting the angular rotation of the locking element with respect to the hub portion.

3. A spool carrier as claimed in claim 1 wherein a cam surface of said cam means is shaped to have stop portions to limit the angular rotational movement of a cam follower engaging the cam surface.

4. A carrier for holding in driving engagement a spool of the kind having one or more recesses in a bush portion for engaging a dog or dogs on a driving member comprising a hub portion with a dog or dogs for engaging said recess or recesses whereby said hub portion with a dog or dogs constitutes said driving member, a spindle carried on said hub portion for axial and rotational movement about the hub axis, a locking element secured on said spindle and having a radially extending ear or ears positioned correspondingly to said dog or dogs so that the spool can pass over the locking element when the ear or each ear is aligned with the corresponding dog but, by rotation of the locking element, the ear or ears can be turned to a position or positions adjacent the side of the spool, and an operating member mounted on the hub portion to be slidable axially therein and to be rotatable therein which operating member is secured to the locking element to effect axial and rotational movement of the locking element, cam means arranged to effect axial movement of the operating member as it is rotated, said cam means comprising a member fixed to said hub portion having at least one axially facing cam surface extending at least partly around said spindle, a radially extending member carried on said spindle and adapted to bear against said cam surface to constitute a cam follower, and spring means urging said radially extending member axially towards said cam surface, said cam means being shaped so that the locking element is moved axially away from the driving member against the spring force as the operating member is rotated from a position in which the locking element clamps the spool on the driving member to a release position where the locking element ear or ears are aligned with said dog or dogs for releasing the spool, the cam means being arranged furthermore so that, in the locking position the aforementioned spring means urges the locking element tightly against the spool.

5. A spool carrier as claimed in claim 4 wherein the spring means comprises a sleeve around said spindle, which sleeve is secured to said driving member and has an inwardly extending flange, a helical spring around said spindle with one end of the spring bearing against said radially extending member and the other end bearing against said inwardly extending flange on said sleeve.

6. A spool carrier as claimed in claim 4 wherein said cam surface is shaped to have stop portions limiting the angular rotation of said cam follower.

7. A carrier for holding in driving engagement a spool of the kind having at least one recess in a bush portion for engaging a dog on a driving member comprising a hub portion with a dog or dogs for engaging said recess whereby said hub portion and dog constitute said driving member, a locking element carried on said hub portion for axial and rotational movement about the hub axis and having at least one radially extending ear positioned so that the spool can pass over the locking element when the ear is aligned with the corresponding dog but, by rotation of the locking member, the ear can be turned to a position adjacent the side of the spool, spring means urging the locking element axially to move the locking element towards the driving member and cam means arranged to effect axial movement of the locking element as it is rotated, said cam means being shaped so that the locking element is moved axially away from the driving member against the spring force as the locking element is rotated from a position in which the locking element clamps the spool on the driving member to a release position where the locking element ear or each ear is aligned with said dog or each dog for releasing the spool, the cam means being arranged furthermore so that, in the locking position the aforementioned spring means urge the locking element tightly against the spool.

References Cited by the Examiner
UNITED STATES PATENTS 2,882,078    4/59    MacDonald _____ 242—68.3 X
2,992,788    7/61    Hardison _____ 242—68.3

MERVIN STEIN, *Primary Examiner.*